United States Patent
Spears (10) Patent No.: US 8,764,513 B1
(45) Date of Patent: Jul. 1, 2014

(54) MEDIA RECYCLING APPARATUS AND PROCESS FOR WET MEDIA BLAST OPERATIONS

(76) Inventor: Richard L. Spears, Seminole, OK (US)

( * ) Notice: Subject to any disclaimer, the term of this patent is extended or adjusted under 35 U.S.C. 154(b) by 454 days.

(21) Appl. No.: 13/373,864

(22) Filed: Dec. 2, 2011

Related U.S. Application Data (60) Provisional application No. 61/460,597, filed on Jan. 5, 2011.

(51) Int. Cl.
*B24C 1/00* (2006.01)
*B24C 9/00* (2006.01)

(52) U.S. Cl.
CPC .. *B24C 9/00* (2013.01); *B24C 9/006* (2013.01)
USPC .................... 451/2; 451/38; 451/88

(58) Field of Classification Search
CPC .................. B24C 9/00; B24C 9/006
USPC ............................. 451/102, 38, 88
See application file for complete search history.

(56) References Cited

U.S. PATENT DOCUMENTS

| | | | | |
|---|---|---|---|---|
| 3,087,615 A | * | 4/1963 | Powell | 209/134 |
| 3,455,062 A | * | 7/1969 | Eppler | 451/88 |
| 4,336,671 A | * | 6/1982 | Nelson | 451/87 |
| 4,376,358 A | * | 3/1983 | Shelton | 451/92 |
| 4,523,988 A | * | 6/1985 | Hedrick, II | 209/11 |
| 5,049,260 A | | 9/1991 | Spears | |
| 5,244,317 A | | 9/1993 | Kuboyama | |
| 5,269,424 A | * | 12/1993 | Lyras | 209/2 |
| 5,545,074 A | | 8/1996 | Jacobs | |
| 5,586,927 A | * | 12/1996 | Herbert | 451/88 |
| 5,637,029 A | | 6/1997 | Lehane | |
| 5,827,114 A | | 10/1998 | Yam | |
| 6,224,463 B1 | | 5/2001 | Hatzell, Jr. | |
| 6,514,128 B1 | * | 2/2003 | Lyras | 451/88 |
| 6,558,238 B1 | | 5/2003 | Crevasse | |
| 6,688,946 B2 | | 2/2004 | Schmidt | |
| 6,932,676 B2 | * | 8/2005 | Troia et al. | 451/38 |

* cited by examiner

*Primary Examiner* — Maurina Rachuba
(74) *Attorney, Agent, or Firm* — Randal D. Homburg (57) ABSTRACT

An apparatus and process used in a wet blasting cleaning operation to deliver and recycle wet media mixed with minimal liquid content to a media accelerator and maintain sizing and composition of the wet media, maximizing the efficiency of the media acceleration device, including a blast wheel or pressurized nozzle.

5 Claims, 5 Drawing Sheets

MEDIA RECYCLING APPARATUS AND PROCESS FOR WET MEDIA BLAST OPERATIONS

CROSS REFERENCE TO RELATED APPLICATIONS

Applicant claims the benefit of Provisional patent Application No. 61/460,597, filed on Jan. 5, 2011, by the same inventor.

I. BACKGROUND OF THE INVENTION

1. Field of Invention

A wet blast apparatus used by metal fabricators to degrease and remove surface contaminants while modifying the surface finish of a workpiece provides a fixed blast wheel or nozzle within a blast cabinet wherein a recycled blast media is intermixed with a wet media and directed to the workpiece with the collected spent media mixture being recycled to remove grease and contaminant material as well as unusable blast media from the spent media mixtures and further redepositing the blast media in a hopper for reuse. A cooperative process using the wet blast apparatus is also disclosed.

2. Description of Prior Art

A preliminary review of prior art patents was conducted by the applicant which reveal prior art patents in a similar field or having similar use. However, the prior art inventions do not disclose the same or similar elements as the present blast media apparatus, nor do they present the material components in a manner contemplated or anticipated in the prior art.

Figure 1A:
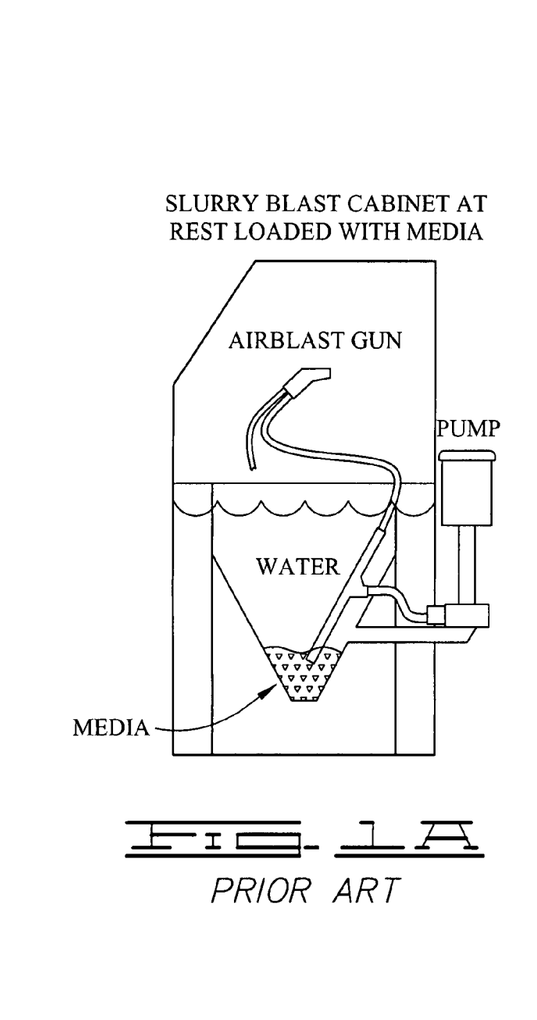
FIG. 1A is a prior art slurry blast cabinet.
Figure 1B:
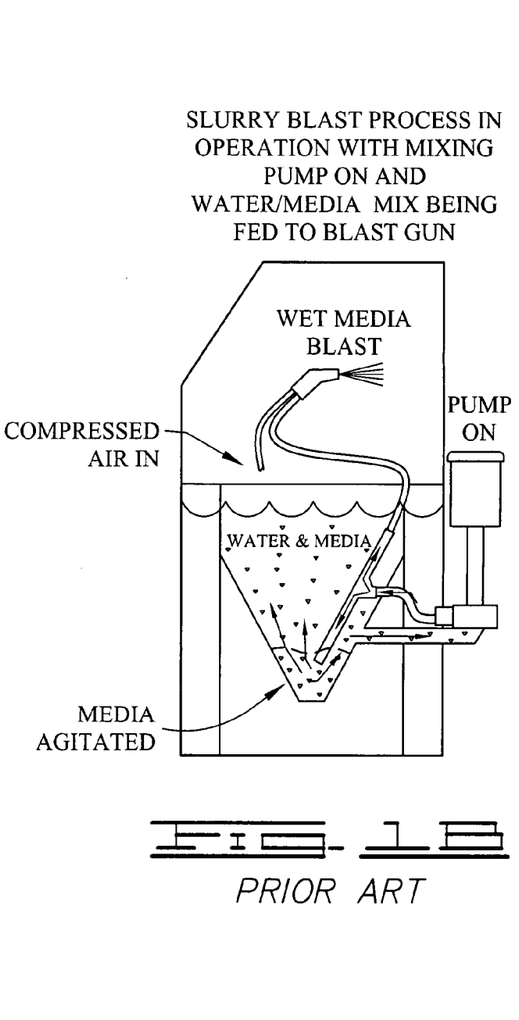
FIG. 1B is another view of a prior art slurry blast cabinet.

As indicated in the prior art drawings, FIGS. 1A and 1B, there are several current media blast devices being used within the field of art. A first device is a mixing hopper type, where water is added to a hopper along with a quantity of abrasive media to create a 20 to 30 percent abrasive mixture to water. A pump mixes the abrasive and water components into a slurry where they are directed to an object to be blasted, most generally through an air blast gun. Compressed air is used as the means to propel the abrasive and water mixture. Cleaning efficiency is generally low due to a low abrasive mixture, the restriction of the non-metallic light weight abrasive constrictions associated with this device and the abrasive generally being undersized or very small, due to the force restrictions of the hand-held spray gun to efficiently blast away the workpiece contaminants. However these devices are economically feasible for low production operations with small capital expenditures. Associated problematic issues include a lack of media size controls, the inability to purge the abrasives which have become too small after use to be reused, and the inability to clean the recycled media and to clear the liquid media hoses which can become plugged and damaged during non-use. Examples of these type of wet blast devices include U.S. Pat. No. 5,049,260 to Spears, U.S. Pat. No. 5,244,317 to Kuboyama, U.S. Pat. No. 5,545,074 to Jacobs and U.S. Pat. No. 5,827,114 to Yam.

Figure 2:
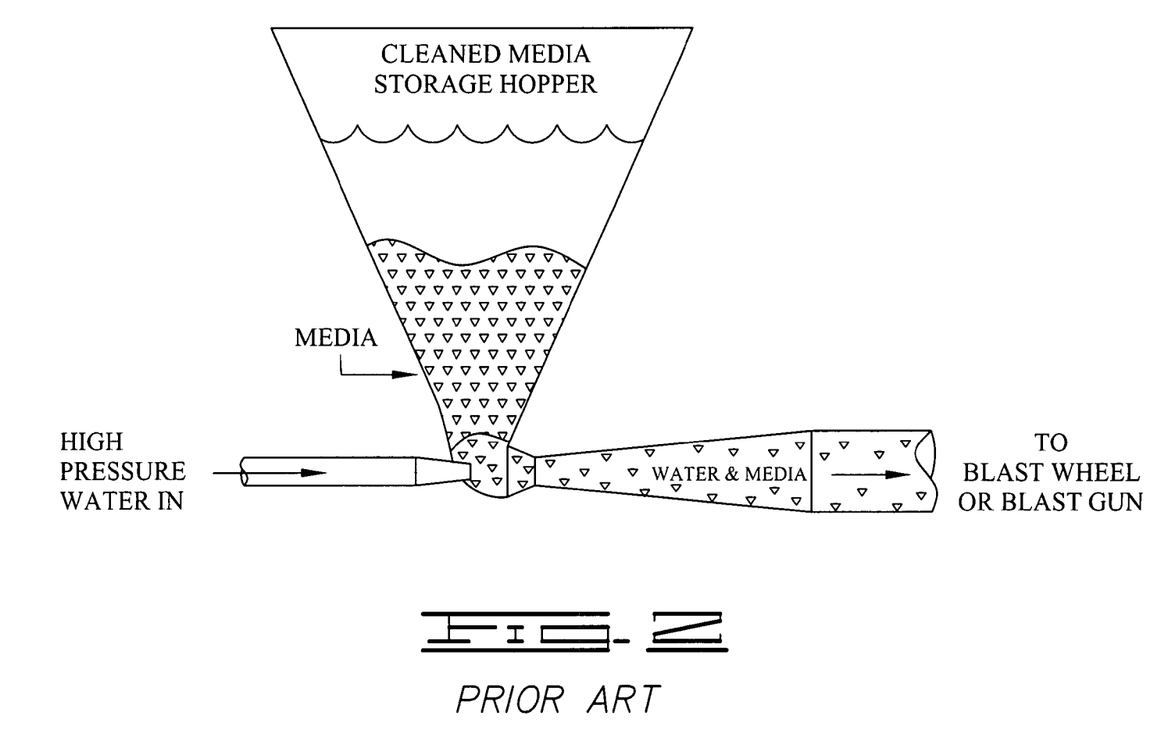
FIG. 2 is a prior art Venturi feed wet blast device.

A more simple type of media delivery device is also noted in the prior art and illustrated in FIG. 2, as a gravity feed hopper. This uses a Venturi-type high pressure water flow which receives an abrasive media through a hopper attached to the water line just beyond the restriction point in the water line, with the high pressure water and abrasive media mixture being delivered through a spray gun or blast wheel to an object. An example of a device employing this type apparatus is found within U.S. Pat. No. 6,224,463 to Hartzell, Jr. This device is generally used for light weight abrasives with a low abrasive to water mixture being somewhere in the 10 to 20 percent range for light-weight abrasive and even lower for the heavier weight abrasives. Abrasive particle regulation is afforded by an in-line screen which is problematic due to frequent clogging requiring removal and replacement during use.

Further prior art patents also disclose devices used for a similar blast process as presented within the present invention. In U.S. Pat. No. 5,637,029 to Lehane, a method and apparatus for shot blasting materials is disclosed which utilizes a recycling system which applies a composite stream of a slurry comprising a carrier liquid and an abrasive particulate material under high velocity to a workpiece in a blast cabinet, reclaims the spent slurry after undersized abrasives are removed, cleanses the liquid for reuse and pumping the clean liquid back at the workpiece for washing and conditioning or for recycling the liquid for recombination with the cleaned abrasive to commence the cycle over again. This invention uses a nozzle which has a divider within it for separating the abrasive material and carrier liquid and discharging it in an overlapping blast pattern.

In the Hartzell, Jr. patent noted above, there is also a recycling component disclosed within its apparatus including a gravity separator for settling of the solid particulate and grit, an in-line filter, a magnet to collect metal particles in the grit after use, several baffles within the separators to direct and divert liquid flows, pneumatic triggers and amplifiers to add air for enhanced velocity and flow of the water and grit mixture and a varying shape of recovery tanks which apparently more efficient due to their shape.

A method and system for cleaning a workpiece using wet blasting is disclosed in U.S. Pat. No. 6,688,946 to Schmidt, which focuses on the removal of cleaned-off dirt and worn-down blasting particles. It provides one of the most verbally convoluted methods ever disclosed and makes little if any sense. However, to attempt a summary, the method disclosed in this patent includes directing the dirt and spent blasting medium into a collection tank where it is lifted to an upper bottom outlet through a worm conveyor into a sedimentation tank where a conveyor leads it where the water is removed or "sucked off" and then sprayed out over the target items. Apparently the next step takes a concentrated blast medium and combines it with a water flow to an ejector unit to a spray head onto a rotating vane wheel which throws the medium towards a movable support surface for the items. Claim 2 does not appear to claim anything except that there is some type of means to determine viscosity by some type of "registration of the counter-effect on the transport means working therein," with claim 3 being a plant for the execution of the method disclosed in claim 1. This type of device, as viewed from the drawings, appears to be more directed to a barrel hopper which agitates and object in the presence of a blast medium with a rinsing feature, but the text is not consistent enough to be sure. Viewing only the cleansing process and recycling aspect, it appears that it uses a worm-drive mechanism which only reclaims particles of a certain size from a sediment within a tank and then a series of plates that separates dirt and takes it away while the water is drained from the mixture. The water is further reclaimed from the dirt and worn-down medium and reused.

II. SUMMARY OF THE INVENTION

Slurry blasting is a technique used primarily in industry for cleaning parts, components and other metal products using a mixture of an abrasive and a liquid and is similar to sandblasting, except for the slurry blasting being a "wet" abrasive process, wherein sandblasting is a dry abrasive process. It is used to remove surface contaminants and to modify a surface profile, offering the ability to combine processes such as degreasing and blast cleaning in one simple step, generating cleaner work without media impregnation. Wide use of a slurry blast is limited to large manufacturing because the process is slower and requires a more complex physical plant than dry blasting, along with limited process control except for those facilities being almost dedicated solely to the process of slurry blasting. Within this disclosure, a more defined term "wet blasting" will be used in place of, but still including slurry blasting, limiting the process being disclosed and claimed as relating to wet media blasting, because in this apparatus and process, the liquids and media are being recycled and treated for reuse to provide a more economical, efficient and justifiable process than mere slurry blasting, which encompasses any type wet media process.

Slurry blasting production rates are generally deterred because of a low ratio of abrasive to water in the operating mixture that is fed to the abrasive accelerating devices and due to the density of the abrasive media that the slurry mixer can manipulate. The abrasive media, not the liquid, provides the majority force necessary to determine the cleaning speed and the surface modifying intensity. The liquid used in the mixture serves to wash away the contaminants broken loose by the media and to minimize redisposition. The prior art, as disclosed previously, uses the liquid to transport the media to the media accelerating device (a wand or a blast wheel) which limits the productivity of the media accelerator (blast wheels) and also is limited by using only lightweight and small media sizes.

Related art has demonstrated use of the blast wheel, which directs the incoming liquid and media mix onto revolving throwing blades propelling a liquid media mixture towards a target surface. In most blast wheels, an excessive amount of liquid is generally used to move the media to the blast wheels and this can greatly reduce the blast productivity and efficiency. Blast wheel are volume limited, so the more water that is used, the less media can be used. Typically, the blast wheels of the prior art deliver a 20-30 percent media to liquid ratio. The present apparatus approaches an 80 percent media to liquid ratio, because the delivered media, while wet, is not delivered in a liquid mixture, but more as a wet solid component drastically increasing the media to liquid ration to the objective levels of at or near 80%.

A first objective of the present apparatus is to provide a more efficient recycling apparatus for delivering a blast media to an object. A second objective of the present apparatus is to create a faster and more efficient apparatus for surface blasting of objects which provide a greater media to liquid ration in the blast mixture. A third objective is to provide a uniform and effective media for use in the apparatus by the removal and disposal of spent media which is used in the recycling process which no longer provides a particle size sufficient to accomplish the blast process. A fourth objective is to provide the device not only to recycle a blast media, but to recycle the liquids used in the blast process and to remove contaminants within the liquid which are cleaned from the object and forward the waste liquids for disposal while the reusable liquids are utilized over in the subsequent process for the blast liquid component and cleansing rinse.

III. DESCRIPTION OF THE DRAWINGS

The following drawings are submitted with this utility patent application.

IV. DESCRIPTION OF THE PREFERRED EMBODIMENT

Figure 3:
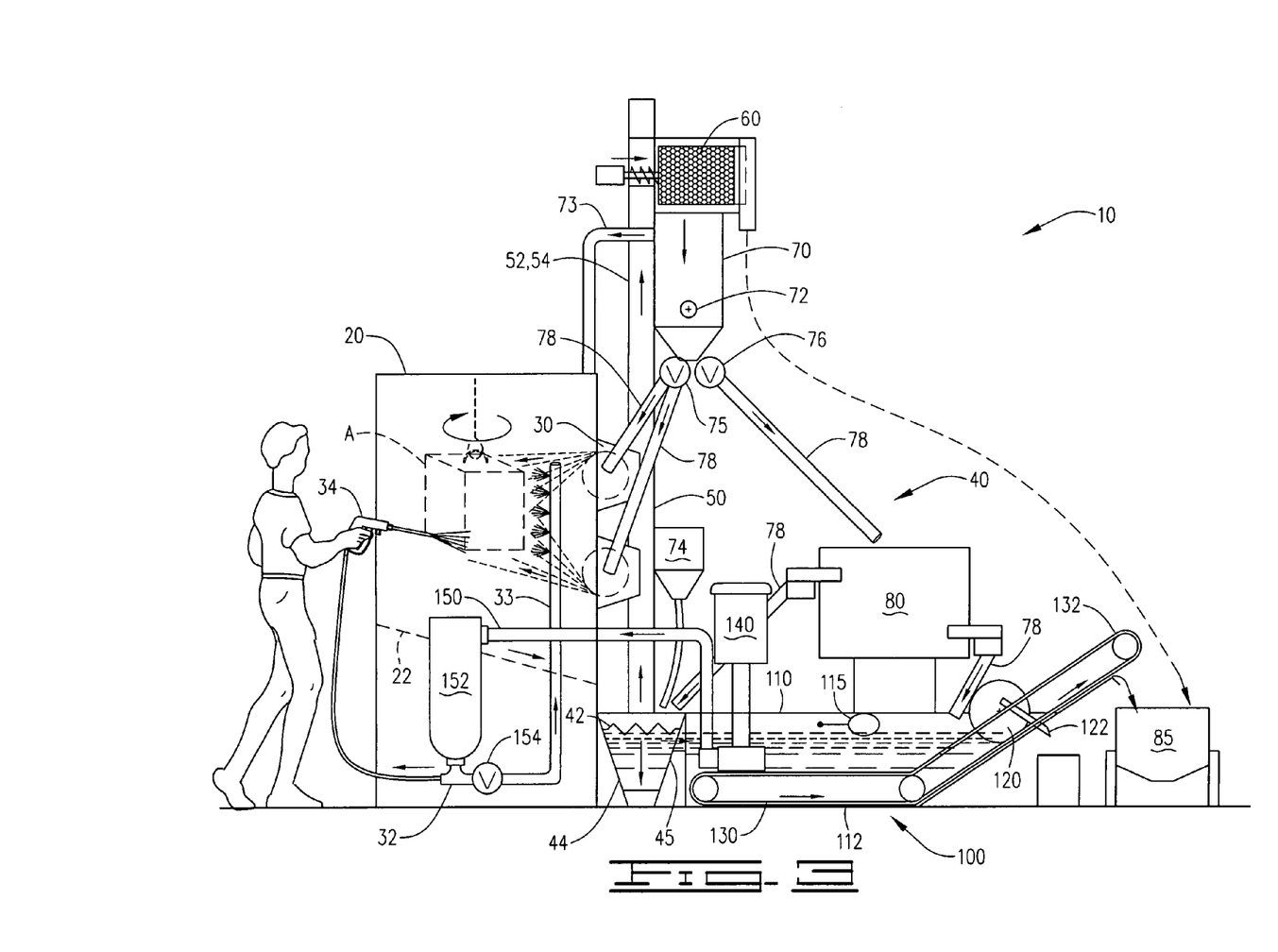
FIG. 3 is a view of the present wet blast apparatus.
Figure 4:
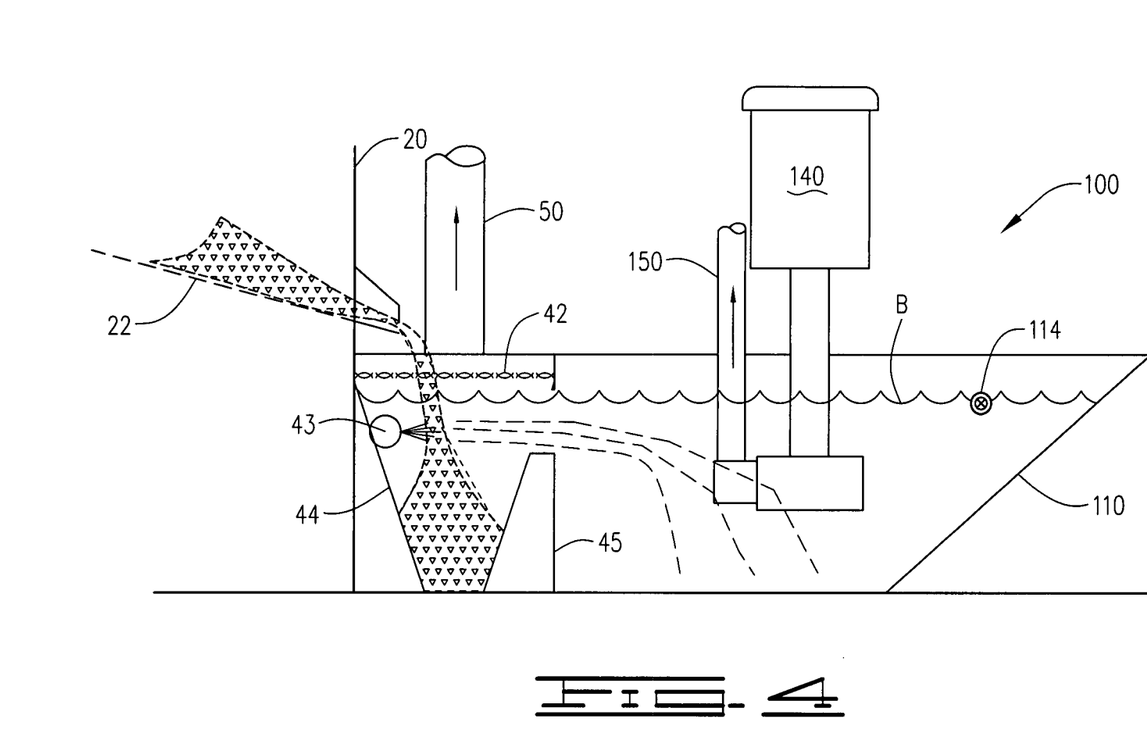
FIG. 4 is an isolated view of the discharge chute from the ramped floor of the blast enclosure disclosing of the used media and liquid mixture being fed through the primary screen filter into the elevator feed container, with the turbulent rinse dynamics as it affects the materials and the liquid reservoir, separated by the reservoir separation panel, and the pump within the liquid reservoir.
Figure 5:
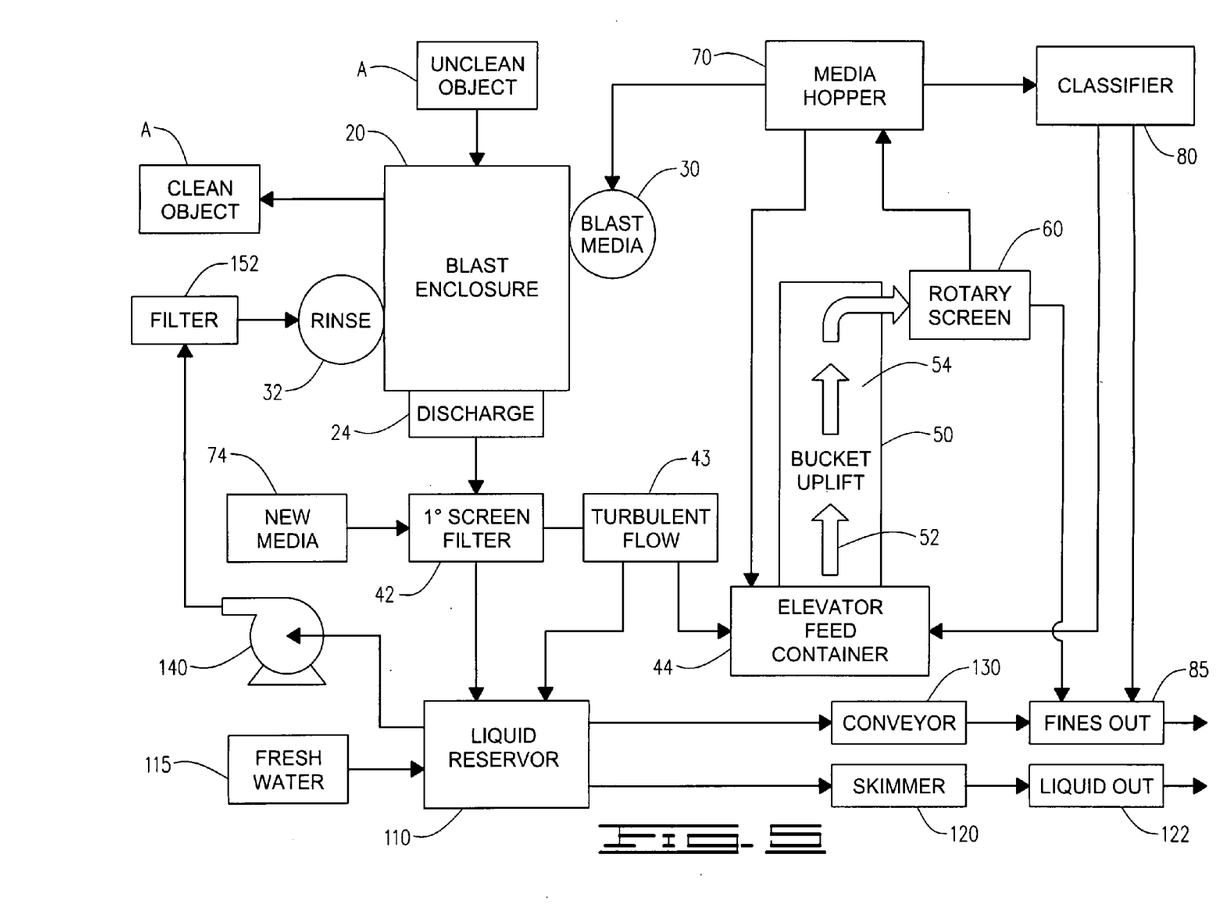
FIG. 5 is a flow chart diagram of the dynamic movements within the wet blast process and the media and liquid recycling assemblies.

An apparatus 10 for delivery of a wet blasting process, utilizing a mixture of an abrasive media which is heavier than water and liquid applied with force and under pressure to an object A for the surface modification and cleaning of the object 10, as indicated in FIGS. 3-5 of the drawings, the apparatus 10 comprising a blast enclosure 20 providing at least one media blast delivery means 30 and at least one liquid rinse means 32, the blast enclosure 20 having a ramped floor 22 directing spent media, liquid and debris to a discharge chute 24, a media recycling assembly 40 defining a fixed primary screen filter 42 at the end of the discharge chute 24, a high pressure liquid tank turbulent rinse 43 in cooperation with a liquid reservoir 110, an elevator feed container 44 to collect filtered media, the elevator feed container 44 defining a reservoir separation panel 45 to segregate the elevator feed container 44 from the liquid reservoir 110, a bucket elevator uplift 50 to gather the collected and filtered media in a series of buckets 52 attached upon a belt-driven mechanism 54, from the elevator feed container 44, upwards and through a rotary screen mechanism 60 for secondary filtration and removal of waste particles and debris, the rotary screen mechanism 60 depositing the cleaned media within a media hopper 70, the media hopper 70 directing the media either to the blast enclosure 20 for reuse or to a classifier 80 where spent media which is too small and decayed to provide a useful media component is sent to a fines discharge collector 85 for disposal and the classified or reusable media is sent back into the elevator feed container 44 for reintroduction to the media hopper 70, and a liquid recycling assembly 100 comprising the liquid reservoir 110, a surface debris removal skimmer 120, and a horizontal conveyor system 130 in the bottom 112 of the liquid reservoir 110, transferring to an up-leg conveyor portion 132, the surface debris removal skimmer 120 sending surface waste to a skimmer discharge chute 122 for disposal, the liquid reservoir 110 providing a pump 140 for the removal of the cleaned liquids and to provide the recycled water for further reuse within the apparatus 10. The apparatus 10 further provides a fresh water source 115 for the replenishment of water as needed and as determined by a water level sensor 114, and a new media supply 74 to replenish the media supply as needed and as determined by a media level sensor 72 within the media hopper 70. The blast delivery means 30 may include any suitable media accelerators, including blast wheels or air blast nozzles, when contemplated within the scope of the apparatus 10 and may be substituted where deemed feasible. The purpose of the apparatus 10 is to deliver a consistent particle size media within the media recycling assembly 40 using as much recycled media as possible and to deliver a cleaned and recycled liquid within the liquid recycling assembly 100 for repeated use within the process of use of the apparatus 10.

The liquid rinse means 32 may be provided as a hand-held wand 34, one or more spray bars 33 provided at different angles to the object within the blast enclosure 20, or both which would be beneficial for odd shaped objects to ensure a thorough cleansing and treatment. The water being delivered through the liquid rinse means may be enhanced by a variety of additives, which may include a detergent, a degreaser or a mild solvent solution. The additive should be of the nature that would no negatively effect the recycling of the liquid and would not impede the functional efficiency of with the surface debris removal skimmer 120, as well as the additive not effecting the abrasive media utilized in the apparatus 10.

Media blast delivery means 30, as previously indicated, are affixed within the blast enclosure 20, but should be adjustable, and can be supplied as a plurality, with various angles being set for each blast delivery means to provide a uniform and efficient throw pattern to the object being treated within the blast enclosure. The speed and quantity of the abrasive media would also be best provided with an adjusting means to control the amount and velocity of the media being used in the blast process to be suitable for the object being treated within the blast enclosure. Further, the blast enclosure 20 may be modified to include enclosure protective zones or adjustable panels to partially limit the exposure of an object within the blast enclosure to avoid treatment to a portion of the object while allowing a full exposure to other section or portions of the object being treated. An object movement system may also be provided within the blast enclosure 20 for the rotation, tumbling, linear movement or reorientation within the blast enclosure during the treatment of the object.

An additional line water filtration means 152 may be included in any portion of the apparatus 10 within the liquid recycling assembly 100, as shown in FIG. 3, which would further provide the rinse water with additional filtration to completely remove any remaining solid debris and also be provided to remove any chemicals or additives from the rinse water to enhance the cleaning of the object, removal of the blast media and any residual debris left on the object from the abrasion process. This may be included in any or all of the water delivery lines 150 within the liquid rinse means 32 after the liquid reservoir 110 or the pump 140. Additional flow control valves 154 can be included within the water delivery lines 150 to control the pressure and flow of the liquids within the apparatus which may include standard gate water valves, stop cocks or manual triggers.

Similarly, the media recycling assembly 40 will include media delivery lines 78 from the media hopper 70 with blast wheel media controls 75 which control the amount of media being delivered to the blast delivery means 30, individually or collectively where a plurality of blast delivery means 30 are used, along with valves 76 used throughout the apparatus 10 which effect the abrasive media delivery or recycling movements, including a manual or automated valve in communication with the media level sensor 72 on the media hopper 70, within a media delivery line 78 to or from the classifier 80, within the bucket elevator uplift 50, or wherever deemed necessary by the final design requirements of the apparatus 10.

The surface debris removal skimmer 120, as shown in FIG. 3 of the drawings, can be provided as a skimmer wheel which rolls along the upper surface B of the liquids within the liquid reservoir 110 which would primarily be used to remove floating solid particles, oils and removed solvents which would have been removed from the object during the blast treatment process and would otherwise be reintroduced or remain within the liquid during the liquid recycling process. Some type of interactive device would also be included, which may include a scraper or scrubber to remove the materials from the skimmer wheel and redirect the removed materials to the skimmer discharge chute 122 for later disposal.

The dynamics resulting from the liquid recycling assembly 100, as indicated in FIG. 5, include the initial use of the liquid in the blast enclosure 20 delivered by the liquid rinse means 32, with the used liquid mixture of spend liquids and media being delivered to the discharge chute 24, FIG. 4, where the first filtration occurs at the fixed primary screen filter 42, which removes the large materials from the wet blast process. A second type of filtration occurs in the liquid reservoir 110 and elevator feed container 44, where the liquids are displaced upward from the heavier-than-water media particles, with the displaced liquids lifting any oils or light residuals to the surface where they are removed by the surface debris removal skimmer 120. A third dynamic occurs at the discharge chute 24 below the primary screen filter 42 by the high pressure liquid tank turbulent rinse 43 which is presented to the discharge material to urge lighter solid particles to be blown sideways over the reservoir separation panel 45 and into the liquid reservoir 110 past the elevator feed container 44, where these lighter particles settle to the bottom 112 of the liquid reservoir 110 wherein they are withdrawn from the liquid reservoir 110 by the horizontal conveyor system 130 and deposited into the fines discharge collector 85, with the remaining liquids left in the liquid reservoir 110 being withdrawn by the pump 140 and further directed to reuse by the liquid rinse means 32. A fourth dynamic occurs with the liquids where the water delivery lines 150 provide the line water filtration means 152, which would be a final filtration prior to reuse within the blast enclosure 20. Of course, a fifth dynamic would occur with the addition of fresh water delivered into the liquid reservoir 110 when the recycling process would deplete the water supply within the apparatus to a point that the addition of fresh water would restore the appropriate functional capacity to the apparatus.

The dynamics within the media recycling assembly 40, also shown in FIG. 5, provide a more efficient return of useable media during the recycling process due to several further disclosed action. First, when the media, liquid and contaminant mixture leaves the blast enclosure 20 through the discharge chute 24, FIG. 4, the mixture passes over the fixed primary screen filter 42 placed at the end of the discharge chute 24 prior to the mixture entering the elevator feed container 44 and the liquid reservoir 110. Most of the large waste particles should be removed at this point, leaving only particles of solid matter behind small enough to pass through the screen. For this purpose, but also considering the desire not to have a perpetually clogged primary screen filter 42, the openings or expansions within the screen should be slightly larger than the media being recycled. Otherwise, recycling would be futile and generally end up with a bypass of the recycling intention due to it being more practical to simply discharge the entire blast enclosure waste without recycling.

Second, the high pressure liquid tank turbulent rinse 43 provides a flow to the materials immediately past the primary screen filter 42 which provides a cross-flow to the liquid, media and contaminant forcing the lighter materials sideways and past the elevator feed container 44 directly below the primary screen filter 24 into the liquid reservoir 110, where further settling of particulate matter occurs in calmer waters, with the preferred outcome to deliver the heavier abrasive media down into the elevator feed container 44 and wash away the lighter solid material contaminants into the liquid reservoir 110 for further removal and discharge via the horizontal conveyor system 130 in the bottom 112 of the liquid reservoir 110.

Third, the media which is collected within the elevator feed container 44 collects the media and concentrates it by settling to the bottom, where it is contained, the heavier media settling to the bottom and forcing the liquids within that container upward and into the liquid reservoir 110 which share a partially contiguous liquid level with that of the elevator feed container 44, FIG. 4. It is important to note here that the abrasive media being used in this apparatus 10 must obviously be heavier than water in order for this apparatus to operate as disclosed. This gravity settled media is then collected by the bucket elevator uplift 50, which collect the settled media and deliver it upwards to the media hopper 70 after passage through the rotary screen mechanism 60, where the fourth dynamic occurs. The media which is gathered in each bucket 52 gathers mostly the solid media materials, as the media displaces a substantial portion of the liquid within the elevator feed container 44. The media recycling assembly has subsequent liquid removal features, including a media hopper liquid overflow lines 73 which further evacuates excess water from the media hopper 70 with the liquid being returned to the liquid recycling assembly 100 for further reuse.

As indicated and fourth, the rotary screen mechanism 60 is a horizontally oriented rotating drum-like device which turns the media delivered by the bucket elevator uplift 50 prior to discharge into the media hopper 70. A selected size particle, the properly sized abrasive media, is discharged into the media hopper 70, while the particles that are unsuitably sized are removed during the rotation of the rotary screen mechanism 60 and sent to the fines discharge collector 85 for disposal. The fourth filtered abrasive media is then retained within the media hopper 70 until being reused. It might be deemed suitable for the addition of new abrasive media to occur within the media hopper 70 and that the media level sensor 72 would detect the level of media and add more new media from the new media supply 74 through the primary screen filter 42 and into the elevator feed container 44, FIG. 3, which is preferred as the best location for the addition of the new abrasive media is into the elevator feed container 44, making it "wet" prior to introduction into the media hopper 70. It has been discovered that the introduction of dry media within wet media can cause lumps to form, which would impede a uniform deliver of media during the blast process. Therefore, emersion of the new media prior to being placed within the media hopper 70 is a preferred within this apparatus and the delivery location disclosed is the best mode found in actual use of the apparatus 10.

A fifth dynamic provided by the media recycling process is the classifier 80, FIG. 3. This classifier 80 is provided in several known embodiments, but what is the optimal purpose of the classifier is in attempting to make the abrasive media be uniform and of an appropriate particle size. In the industrial application of wet blasting, it is desired that the wet blasting be customized for a particular object having a particular need for either resurfacing, "wet sanding" of simply cleansing. Thus, it is necessary that an abrasive media be selected in a subjective manner. An abrasive media of a particular size, shape and material composition is selected which enables the wet blast to accomplish its intended purpose without destruction of damage to the object being treated. Some object require heavy blasting, while others simply require a light blasting. Therefore, the classifier 80 is most useful in maintaining the abrasive media particle of a uniform size and shape, discarding those that have been worn down too small and retaining those that are still a useful size and shape. Although not disclosed in any specific embodiment, those skilled in the art may determine the most suitable classifier 80 to be used in the apparatus 10, which may include an inclined ramp with surface irregularities wherein the larger particles and retained and the light particles flow past the classifier surface, a series of perforated screens, a centrifugal force separation classifier, or any other suitable classifier device.

The apparatus 10, including all its media recycling assembly components and liquid recycling assembly provides the capability to deliver up to an 80% media to water ratio mixture to the one or more blast delivery means 30, with the media delivery lines 78 to the blast delivery means 30 allowing for an adjustment of this ratio prior to or during use of the apparatus 10, the adjustment accomplished by the previously disclosed valves 76 and/or media controls 75.

A process using the above disclosed apparatus is also disclosed and incorporated into the apparatus 10, as indicated by a flow chart shown in FIG. 5. Using the disclosed apparatus 10, use of the apparatus 10 would included the steps necessary and inferred in the movement of the liquids and abrasive media throughout the apparatus and as delivered to the object B within the blast enclosure 20, with the materials being recycled or the spent materials and waster products being discharged for disposal.

It should be noted that while the bucket elevator uplift 50 comprising a series of buckets 52 attached to a belt-driven mechanism 54 is the preferred disclosed device to transfer the used media from the elevator feed container 44 to the media hopper 70, it is contemplated that one might substitute a screw-type lift, a cable or alternative belt lift, a rotating disk or chain drive means, a magnetic driven device or other technology used to transfer particulate materials in a vertical direction. While the apparatus 10 has been particularly shown and described with reference to a preferred embodiment thereof, it will be understood by those skilled in the art that changes in form and detail may be made therein without departing from the spirit and scope of the apparatus.

What is claimed is:

1. An apparatus for use in a wet blasting process, utilizing a mixture of a consistent sized particle abrasive media which is heavier than water and a cleaned liquid applied with force and under pressure to an object to undergo surface modification and cleaning of said object, said apparatus comprising:

a blast enclosure providing at least one media blast delivery means and at least one liquid rinse means, said blast enclosure having a ramped floor directing spent media, liquid and debris to a discharge chute;

a media recycling assembly defining a fixed primary screen filter below said discharge chute, a high pressure liquid tank turbulent rinse in cooperation with a liquid reservoir, an elevator feed container to collect filtered media, said elevator feed container defining a lower reservoir separation panel segregating said elevator feed container from said liquid reservoir, a bucket elevator uplift to gather collected and filtered media from said elevator feed container in a series of buckets attached upon a belt-driven mechanism, upwards and through a rotary screen mechanism for secondary filtration and removal of waste particles and debris, said rotary screen mechanism depositing cleaned media within a media hopper, said media hopper routing said media either to said blast enclosure for reuse or to a classifier where spent media which is too small or decayed to provide a useful media component is sent to a fines discharge collector for disposal with the classified or reusable consistently sized particle media sent back into said elevator feed container for reintroduction to said media hopper; and a liquid recycling assembly comprising said liquid reservoir, a surface debris removal skimmer, and a horizontal conveyor system in a bottom of said liquid reservoir, transferring to an up-leg conveyor portion, said surface debris removal skimmer sending surface waste to a skimmer discharge chute for disposal, said liquid reservoir providing a pump for removal of cleaned liquids and to provide recycled water for further reuse within said apparatus, wherein a media to liquid ratio of up to 80% can be delivered to said object with said blast enclosure.

2. The apparatus as disclosed in claim 1, further comprising:
a fresh water source for replenishing water as needed and as determined by a water level sensor, and
a new media supply replenishing media supply as needed and as determined by a media level sensor within said media hopper.

3. The apparatus as disclosed in claim 1, further comprising:
said liquid rinse means provided as a hand-held wand, one or more spray bars provided at different angles to said object within said blast enclosure, or both, which would be beneficial for odd shaped objects to ensure thorough cleansing and treatment.

4. The apparatus as disclosed in claim 1, further comprising:
an additional line water filtration means installed within said apparatus within said liquid recycling assembly which would further provide rinse water with additional filtration to completely remove any remaining solid debris, to remove any chemicals or additives from rinse water to enhance the cleaning of the object, and to remove any residual media left on said object, said additional line water filtration means included in any or all water delivery lines within said liquid rinse means after said liquid reservoir or said pump, with additional flow control valves included within said water delivery lines to control pressure and flow of the liquids within said apparatus; and media delivery lines from said media hopper and blast media controls which control amounts of media delivered to said blast delivery means, individually or collectively, where a plurality of blast delivery means are used, along with valves used throughout said media recycling assembly control the flow of abrasive media delivery or recycling movements, including a manual or automated valve in communication with said media level sensor on said media hopper, within a media delivery line to or from said classifier, within said bucket elevator uplift, or any other location within said media recycling assembly deemed necessary by the final design requirements of said apparatus.

5. A process involved in the delivery of a wet blasting media to an object utilizing an apparatus as disclosed in claim 1, comprising the steps of:
introducing an object into said blast enclosure for treatment by wet blasting;
delivering a controlled flow of media to at least one said blast delivery means directed towards said object and contemporaneously delivering a controlled flow of liquid to at least one said liquid rinse means, with a ratio of media to liquid of up to 80%;
collecting said media and said liquid from said blast enclosure upon said ramped floor of said blast enclosure and diverting said used liquid, media and waste out of said discharge chute;
filtering said media and liquid from said blast enclosure through said primary screen filter to remove large contaminants and waste;
gathering said liquid and media from said primary screen filter through said turbulent rinse with said media collected within said elevator feed container, and said liquid being diverted to said liquid reservoir wherein said waste liquid materials upon said upper surface of said liquid are removed by a debris removal skimmer;
removing said media from said elevator feed container and directing said media through said rotary screen hopper to remove small particles of debris from said media;
diverting a portion of said media to said classifier to remove and undersized or spend media and referring said remaining media to said elevator feed container;
directing a portion of said media to said media hopper for reintroduction within said blast enclosure;
collecting said liquid with said liquid reservoir by said pump for reintroduction with said blast enclosure;
directing said waste liquid materials to said skimmer discharge chute for proper disposal and directing said waste media materials from said primary filter screen, said rotary screen mechanism said classifier and from said horizontal conveyor and upleg portion to said fines discharge collector for proper disposal;
adding additional liquid to said process when needed and as indicated by said water level sensor to said liquid reservoir and adding additional media to said elevator feed container when needed as indicated by said media level sensor; and
repeating the above steps until said object has reached a desired level of completion by the wet blast process.

* * * * *